United States Patent
Wilson et al.

[19]

[11] Patent Number: 6,101,957
[45] Date of Patent: Aug. 15, 2000

[54] APPARATUS FOR AFTER-BURNING FUEL RICH ROCKET EXHAUST PRODUCTS

[75] Inventors: Kenneth J. Wilson; Eric D. Erickson; Klaus C. Schadow, all of Ridgecrest, Calif.

[73] Assignee: The United States of America as represented by the Secretary of the Navy, Washington, D.C.

[21] Appl. No.: 09/330,210

[22] Filed: Jun. 11, 1999

Related U.S. Application Data

[63] Continuation-in-part of application No. 09/087,692, May 26, 1998, abandoned.

[51] Int. Cl.[7] ............................... F23G 7/00; B05B 7/04; B63H 25/46
[52] U.S. Cl. .................. 110/237; 588/202; 239/431; 239/434; 239/265.17; 239/265.11; 239/DIG. 7
[58] Field of Search ...................... 110/237, 235, 110/346; 239/431, 434, 265.17, 265.11, DIG. 7; 588/202, 203

[56] References Cited

U.S. PATENT DOCUMENTS

| | | |
|---|---|---|
| 2,496,351 | 2/1950 | Mazzoni .................................. 60/35.6 |
| 4,389,979 | 6/1983 | Saxlund ..................................... 122/15 |
| 5,458,071 | 10/1995 | Tadmor et al. .......................... 110/237 |
| 5,725,614 | 3/1998 | Hirayama et al. ........................... 48/76 |
| 5,836,258 | 11/1998 | Ruegg et al. ............................ 110/346 |

*Primary Examiner*—Denise L. Ferensic
*Assistant Examiner*—Ken Rinehart
*Attorney, Agent, or Firm*—David Kalmbaugh

[57] ABSTRACT

An apparatus for the disposal of solid rocket motors which produce exhaust gases containing flammable and/or explosive products. The solid rocket motor to be burned is first detachably connected to and inserted in one end of an elongated mixing chamber which has, at an opposite end, a multi-step expansion nozzle. The rocket motor is then ignited and the exhaust gas is passed into the mixing chamber, which is sufficiently large to reduce the velocity of exhaust gases from supersonic to subsonic. Air is injected into the mixing chamber to react with flammable and/or explosive products in the exhaust gases and the resultant mixture is then discharged from the mixing chamber through a multi-step expansion nozzle to expand the gaseous mixture and, at the same time, produce substantial turbulence within the gas mixture which is about six times higher than the turbulence levels produced by a constant area circular nozzle. The expansion nozzle has an inner wall with a stair-step shaped surface, having an aspect ratio of not less than 2 and not greater than 10, to create the increased turbulence levels within the multistep nozzle.

16 Claims, 2 Drawing Sheets

APPARATUS FOR AFTER-BURNING FUEL RICH ROCKET EXHAUST PRODUCTS

This application is a continuation-in-part of U.S. patent application Ser. No. 09/087,692, filed May 26, 1998 now abandoned.

BACKGROUND OF THE INVENTION

1. Field of the Invention

The present invention relates in general to disposal of demilitarized rocket motors and, more particularly, to an apparatus for after-burning of rocket exhaust products.

2. Description of Related Art

The government currently has hundreds of thousands of ordnance items nearing the end of their shelf life, which for reasons of safety, the government must dispose of. Current disposal strategies involving open burning or open detonation result in environmental contamination, which will probably not be permitted in the future.

Moreover, many of the recovery strategies for disposal of old ordnance are considered unsafe with some propellant formulations. Contamination with heavy metals also limits the choice of disposal techniques. Combustion of propellants into a confined space to permit scrubbing results in the generation of quantities of explosive gas mixtures on a time scale that conventional disposal equipment cannot respond to. Explosions of these explosive gas mixtures could cause expensive damage to cleanup equipment.

Solid rocket motors, which are required to be burned for demilitarization, are known to produce combustible gases and products that are environmentally harmful. Previous attempts to dispose of rocket motors by contained burning resulted in an explosive mixture being present because of incomplete burning in the rocket motor exhaust. The destruction of these gases by effective after-burning can eliminate an explosive hazard in a containment vessel, and greatly reduce harmful products vented to the atmosphere.

A rocket motor must produce high supersonic velocities for maximum thrust. Because of the high differential in velocities between the rocket motor plume and the surrounding air, mixing of fuel and air is poor, and combustion incomplete.

Accordingly, it is an object of the present invention to provide an apparatus for the complete and rapid burning of explosive gases generated by the burning of rocket motors.

It is also an object of the present invention to provide an apparatus for the disposal of rocket motors without a potential buildup of explosive gas mixtures.

It is yet another object of the present invention to provide an apparatus for the disposal of rocket motors which will permit the rapid depletion of concentrations of explosive gas mixtures.

It is still another object of the present invention to provide an apparatus for the after-burning of exhaust gases from rocket motors to effectively eliminate any explosive hazard, and greatly reduce harmful products vented to the atmosphere.

Other objects, advantages and novel features of the present invention will become apparent from the detailed description of the preferred embodiment of the invention when considered in conjunction with the accompanying drawings.

SUMMARY OF THE INVENTION

The present invention comprises an apparatus for the disposal by burning of solid rocket motors whose exhaust gases contain flammable and/or explosive products, without producing environmentally harmful combustion products. A solid rocket motor to be disposed of is detachably connected to an opening in one end of an elongated mixing chamber, which has a multistep expansion nozzle attached to an opening at the opposite end of the mixing chamber. The mixing chamber and multistep nozzle are physically sized so that supersonic exhaust gases from the rocket motor are slowed to a subsonic velocity within the mixing chamber to uniformly distribute within the mixing chamber the exhaust gases. The multistep expansion nozzle has an inner wall with a stair-step shaped surface to produce turbulence levels which are about six times higher than the turbulence levels produced by a circular, gradually expanding nozzle without a stepped inner side wall.

DETAILED DESCRIPTION OF THE DRAWINGS

Figure 1:
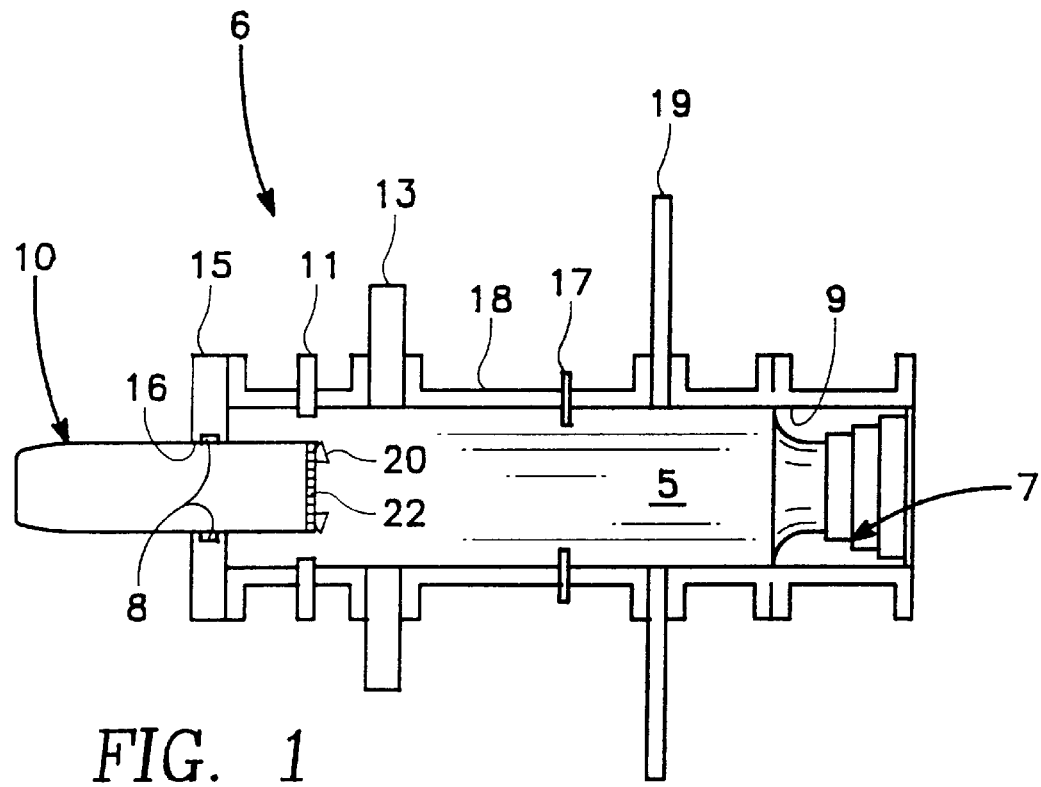
FIG. 1 is a cross-sectional view of the apparatus comprising the present invention which illustrates the position of the rocket motor and mixing chamber, and the configuration of the multistep expansion nozzle attached thereto.

Referring to FIG. 1, there is shown an apparatus 6 for the disposal of solid rocket motors whose exhaust contains flammable and/or explosive products by burning without producing environmentally harmful combustion products. A rocket motor such as an Army Shillelagh rocket, shown generally by the reference numeral 10, is secured in an opening 6 of a mixing chamber 5. Mixing chamber 5 is an elongated cylindrical shaped vessel with openings at both ends. Exhaust gases from a solid rocket motor 10 are passed into mixing chamber 5 to reduce the velocity of exhaust gases from supersonic to subsonic.

Attached to mixing chamber 5 is a multistep expansion nozzle, designated generally by the reference numeral 7, which is mounted within in an opening 9 of mixing chamber 5. Mixing chamber 5 includes air injection ports 11 through which air is introduced into mixing chamber 5, to facilitate complete combustion of exhaust gases generated by rocket motor 10. The inside diameter of mixing chamber 5 is twelve inches and the length of mixing chamber 5 is approximately five feet, excluding the section of mixing chamber 5 containing rocket motor 10.

The preferred embodiment of the present invention includes four equally spaced apart air injection ports (i.e. spaced apart ninety degrees) with two of the four air injection ports being shown in FIG. 1.

The resultant mixture of rocket motor exhaust gases and injection air from air injection ports 11 is passed through mixing chamber 5 into multistep expansion nozzle 7 where the gas mixture is expanded while at the same time producing turbulence within the gas mixture about six times higher than those produced by a gradually expanding circular nozzles. Apparatus 6 produces a highly stable flame at the nozzle exit of nozzle 7, more complete combustion, and efficient destruction of flammable and/or explosive gases.

In the preferred embodiment, a partition or gate valve 13 is placed between rocket motor 10 and the remaining system so as to isolate the mixing chamber 5 from the rocket motors when rocket motors are changed for the purpose of keeping contaminants away from the operators. Rocket motor 10 is detachably secured to mixing chamber 5 by means of a clamping device 15 which retains motor 10 at the front end of mixing chamber 5 allowing a pair of booster nozzles 20 and ten gas generator nozzles 22 of motor 10 to be contained within mixing chamber 5. When rocket motor 10 is aligned on the longitudinal axis of mixing chamber 5 (as shown in FIG. 1) the two booster nozzles 20 are respectively canted twenty degrees upward and twenty degrees downward from the longitudinal axis of mixing chamber 5.

It should be noted that gas generator nozzles of motor 10 are the reaction control jets for motor 10.

There is also a gas tight seal 8 between the walls 16 of the rocket motor 10 and the walls of the mixing chamber 5 so as to prevent the escape of rocket exhaust gases.

Conventional spark ignitors 17 are included in the circumferential wall 18 of mixing chamber 5 to provide sparks for combustion of any combustible or explosive gas mixtures within mixing chamber 5. The preferred embodiment of the present invention includes four equally spaced apart spark ignitors (i.e. spaced apart ninety degrees) with two of the four spark ignitors being shown in FIG. 1.

A bulkhead indicated generally by the reference numeral 19 is used for mounting of the mixing chamber 5, and so as to separate the exhaust emanating from multistep nozzle 7 from the rocket motor 10.

Figure 2:
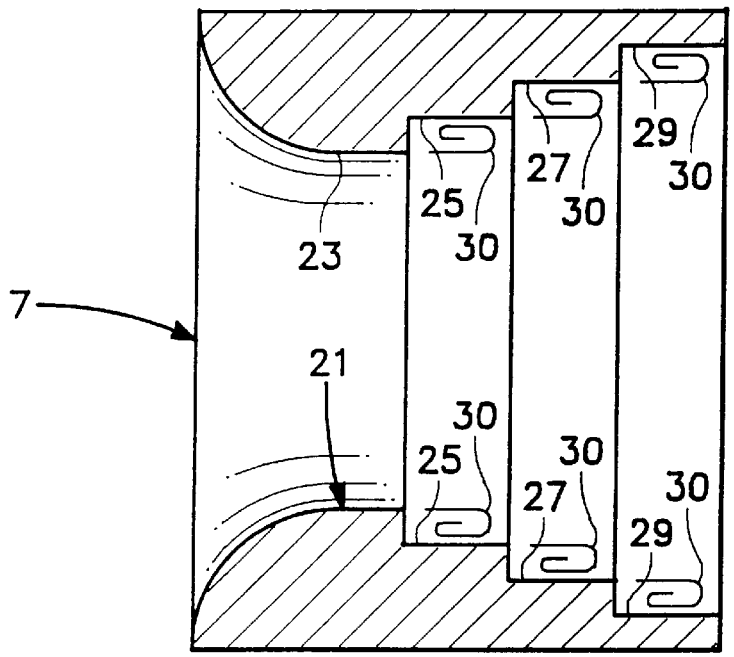
FIG. 2 is an enlarged cross-sectional view of the multistep expansion nozzle utilized in the apparatus of the present invention which illustrates the cross section of the inside wall of the expansion nozzle.

The multistep nozzle 7, which is illustrated in greater detail in FIG. 2, comprises a stair-step configuration on the inside wall 21 of multistep nozzle 7. In the throat section 23 of multistep nozzle 7, the wall is relatively smooth and does not have a stair-step design. However, where it is desired to expand the gases after passing through the throat section 23, the inside wall 21 of multistep nozzle 7 has on its inner surface a stair-step shape or configuration comprising a plurality of steps 25, 27 and 29. This stair-step configuration allows the inside diameter of multistep nozzle 7 to expands abruptly in increments, rather than gradually.

The step length and the step height of the stair-step shaped inner surface 7 of the multistep nozzle 5 may have an aspect ratio (A/R), represented by step length/step height, of between 2 and 10. Ideally, the aspect ratio would be between 5 and 7.

When gas mixtures enter multistep nozzle 7, recirculation zones 30 are formed at each step 25, 27 and 29 of nozzle 7. The recirculation zones 30 provide for a substantial increase in the turbulence of the gas mixtures which results in a complete and rapid burning of explosive gases generated by the burning of rocket motor 10.

In the preferred embodiment the inside diameter of nozzle 7 at throat section 23 is 5.6 inches. At step 25 the inside diameter is 6.8 inches, at step 27 the inside diameter is 8.0 inches, and at step 29 the inside diameter is 9.2 inches. The overall length of each step 25, 27 and 29 is 3.0 inches, while throat section 23 of nozzle 7 has an overall length of 6.0 inches. Since the height of each step 25, 27 and 29 is 0.6 inches and the length of each step 25, 27 and 29 is three inches, the aspect ratio is five for nozzle 7.

The multistep nozzle 7 produces turbulence levels about six times higher than with a circular gradually expanding nozzle without a stepped inside wall.

Figure 3:
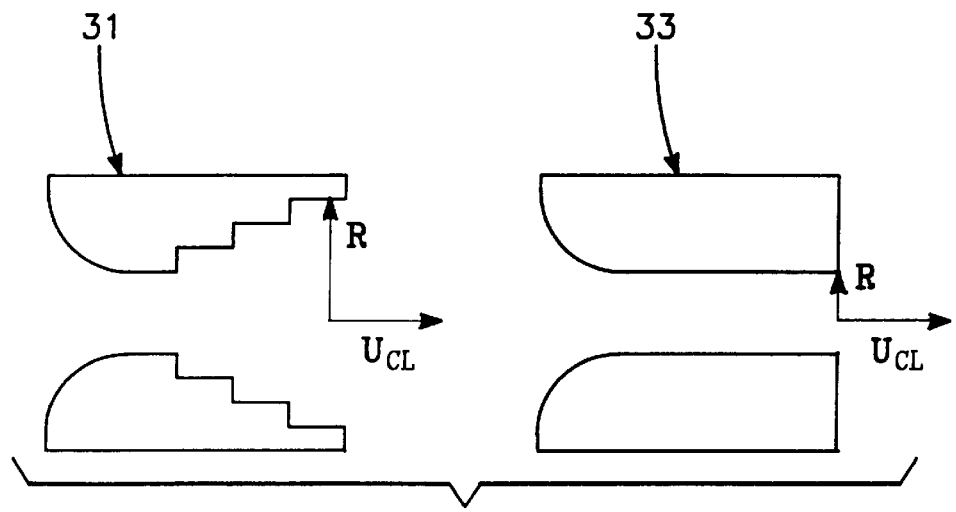
FIG. 3 is a partial view of the multistep expansion nozzle of FIG. 2 and a circular nozzle.
Figure 4:
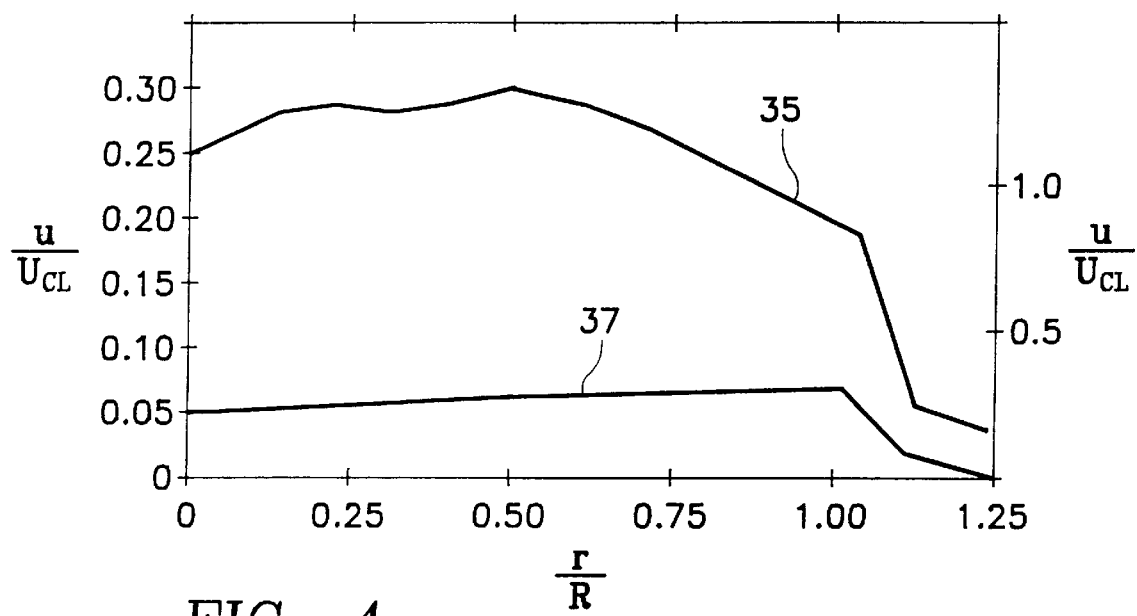
FIG. 4 is a graph depicting the turbulence levels of the multistep expansion nozzle and circular nozzle of FIG. 3.

Referring to FIGS. 3 and 4, the graph of FIG. 4 illustrates the turbulence level 35 for the multistep expansion nozzle 31 of FIG. 3 and the turbulence level 37 for the circular nozzle 33 of FIG. 3. For the graph of FIG. 4, U defines the mean velocity and $u'/U_{CL}$ defines the turbulence level for multistep nozzle 31 and circular nozzle 33. The radius at the nozzle exit for nozzles 31 and 33 is R and the point of a measurement is at a distance r. This provides for a normalized value of r/R, which has a maximum value of 1 at the maximum radius of each nozzle 31 and 33. $U_{CL}$ is the velocity at the exit of the jet measured at the nozzle center line of each nozzle 31 and 33, where $U_{CL}$ is at its maximum value. The profile, i.e. plots 35 and 37, is normalized to the value $u/U_{CL}$. As shown in FIG. 4, the turbulence level for circular nozzle 33 has a value of 0.05 at the centerline of the exit of the nozzle (r/R=0), while the turbulence level for the multistep nozzle is about 0.28 when r/R=0.50. This provides for the increase of about 6 in turbulence intensity for the multistep nozzle comprising the present invention when compared to a circular nozzle.

The following is intended to illustrate the operation of the present invention when being used with a Shillelagh rocket motor, illustrated in FIG. 1.

A Shillelagh surface-to-surface gun-launched solid propellant missile 10 comprises two separate solid propellants, one of which includes booster nozzles 20 which are used as a booster to initiate flight, and the other includes gas generator nozzles 22 that control a missile for the duration of flight. The boost phase contains 6.9 pounds of propellant which burns in approximately 1.3 seconds, and the gas generator 6.3 pounds of propellent which provides reaction control for up to twenty seconds of flight.

Air was injected into mixing chamber 5 at four locations through air injection ports 11, which are in the same plane as the reaction control jets 22 of motor 10. Once in mixing chamber 5, the exhaust products velocity was slowed to a subsonic level and uniformly distributed within the mixing chamber 5 near the entrance to the multistep nozzle 7. The result was a highly stable flame emitted from the nozzle 7, with more complete combustion and destruction of the flammable and/or explosive gases emitted from the Shillelagh rocket motor.

Gases generated from the Shillelagh missile were sampled and the exhaust products of the multistep nozzle were analyzed. It was determined that 95% of the hydrogen emitted from the two solid propellant grains was destroyed in apparatus 6, and 45% of the carbon monoxide products from the Shillelagh rocket motor were destroyed in apparatus 6.

From the foregoing, it may readily be seen that the present invention comprises a new, unique and exceedingly useful apparatus for after-burning fuel rich rocket exhaust products which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. An apparatus for the burning of a solid rocket motor having a rocket nozzle which generates exhaust gases containing flammable and explosive products, comprising:

a cylindrical shaped mixing chamber having a circumferential wall and a first opening at one end of said mixing chamber, the first opening of said mixing chamber being adapted to receive said solid rocket motor allowing a portion of said solid rocket motor and said rocket nozzle to be located within said mixing chamber;

said solid rocket motor being secured to said mixing chamber by means of a clamp positioned at the first opening of said mixing chamber, said clamp including a seal abutting said solid rocket motor to form a gas tight seal for preventing an escape of said exhaust gases through the first opening of said mixing chamber;

said mixing chamber having a second opening at the other end of said mixing chamber and a plurality of air injection ports located in the circumferential wall of said mixing chamber near said rocket nozzle; and a multistep expansion nozzle positioned in the second opening of said mixing chamber and attached to said mixing chamber, said multistep expansion nozzle having an inner wall with a stair-step shaped inner surface, said stair-step shaped inner surface comprising a plurality of steps having an aspect ratio in a range of between five and seven.

2. The apparatus of claim 1, wherein said plurality of steps comprises first, second and third steps each of said first, second and third steps having said aspect ratio in the range of between five and seven.

3. The apparatus of claim 1 wherein each of said first, second and third steps has a length of three inches and a height of 0.6 inches resulting in each of said first, second and third steps having an aspect ratio of five.

4. The apparatus of claim 1 wherein said plurality of air injection ports comprises first, second, third and fourth air injection ports, said first, second, third and fourth air injection ports being spaced apart ninety degrees within the circumferential wall of said mixing chamber.

5. The apparatus of claim 1, wherein said mixing chamber and said multistep expansion nozzle are physically sized to slow said exhaust gases generated by said rocket motor from a supersonic velocity to a subsonic velocity, and substantially uniformly distribute said exhaust gases within said mixing chamber near the entrance to said multistep expansion nozzle.

6. The apparatus of claim 1 wherein said mixing chamber has an inside diameter of about twelve inches and a length of about five feet excluding a portion of said mixing chamber containing said solid rocket motor.

7. An apparatus for the burning of a solid rocket motor having a rocket nozzle which generates exhaust gases containing flammable and explosive products, comprising:

a cylindrical shaped mixing chamber having a circumferential wall and a first opening at one end of said mixing chamber, the first opening of said mixing chamber being adapted to receive said solid rocket motor allowing a portion of said solid rocket motor and said rocket nozzle to be located within said mixing chamber;

a clamp positioned at the first opening of said mixing chamber, said clamp securing said solid rocket motor to said mixing chamber, said clamp including a seal abutting said solid rocket motor to form a gas tight seal for preventing an escape of said exhaust gases through the first opening of said mixing chamber;

said mixing chamber having a second opening at the other end of said mixing chamber and a plurality of air injection ports located in the circumferential wall of said mixing chamber near said rocket nozzle; and a multistep expansion nozzle positioned in the second opening of said mixing chamber and attached to said mixing chamber, said multistep expansion nozzle having an inner wall with a stair-step shaped inner surface, said stair-step shaped inner surface comprising first, second and third steps having an aspect ratio of approximately six.

8. The apparatus of claim 7 wherein each of said first, second and third steps has a length of three inches and a height of 0.6 inches resulting in each of said first, second and third steps having said aspect ratio of approximately five.

9. The apparatus of claim 10, wherein said mixing chamber and said multistep expansion nozzle are physically sized to slow said exhaust gases generated by said rocket motor from a supersonic velocity to a subsonic velocity, and substantially uniformly distributed said exhaust gases within said mixing chamber at the entrance to said multistep expansion nozzle.

10. The apparatus of claim 7 wherein said mixing chamber has an inside diameter of about twelve inches and a length of about five feet excluding a portion of said mixing chamber containing said solid rocket motor.

11. The apparatus of claim 7, wherein said multistep expansion nozzle is sized to produce a turbulence level about 6 times higher than a gradually expanding nozzle without a stepped inner wall.

12. An apparatus for the burning of a solid rocket motor having a rocket nozzle which generates exhaust gases containing flammable and explosive products, comprising:

a cylindrical shaped mixing chamber having a circumferential wall and a first opening at one end of said mixing chamber, the first opening of said mixing chamber being adapted to receive said solid rocket motor allowing a portion of said solid rocket motor and said rocket nozzle to be located within said mixing chamber;

a clamp positioned at the first opening of said mixing chamber, said clamp securing said solid rocket motor to said mixing chamber, said clamp including a seal abutting said solid rocket motor to form a gas tight seal for preventing an escape of said exhaust gases through the first opening of said mixing chamber;

said mixing chamber having a second opening at the other end of said mixing chamber and first, second, third and fourth air injection ports located in the circumferential wall of said mixing chamber near said rocket nozzle, said first, second, third and fourth air injection ports being spaced apart ninety degrees within the circumferential wall of said mixing chamber; and a multistep expansion nozzle positioned in the second opening of said mixing chamber and attached to said mixing chamber, said multistep expansion nozzle having an inner wall with a stair-step shaped inner surface, said stair-step shaped inner surface comprising first, second and third steps, each of said first, second and third steps having a length of three inches and a height of 0.6 inches resulting in each of said first, second and third steps having an aspect ratio of approximately five.

13. The apparatus of claim 12, wherein said mixing chamber and said multistep expansion nozzle are physically sized to slow said exhaust gases generated by said rocket motor from a supersonic velocity to a subsonic velocity, and substantially uniformly distribute said exhaust gases within said mixing chamber near the entrance to said multistep expansion nozzle.

14. The apparatus of claim 12, wherein said mixing chamber has an inside diameter of about twelve inches and a length of about five feet excluding a portion of said mixing chamber containing said solid rocket motor.

15. The apparatus of claim 12, wherein said multistep expansion nozzle is sized to produce a turbulence level about 6 times higher than a gradually expanding nozzle without a stepped inner wall.

16. An apparatus for the burning of a solid rocket motor having a rocket nozzle which generates exhaust gases containing flammable and explosive products, comprising:

a cylindrical shaped mixing chamber having a circumferential wall and a first opening at one end of said mixing chamber, the first opening of said mixing chamber being adapted to receive said solid rocket motor allowing a portion of said solid rocket motor and said rocket nozzle to be located within said mixing chamber;

said mixing chamber having a second opening at the other end of said mixing chamber and a plurality of air injection ports located in the circumferential wall of said mixing chamber near said rocket nozzle; and a multistep expansion nozzle positioned in the second opening of said mixing chamber and attached to said mixing chamber, said multistep expansion nozzle having an inner wall with a stair-step shaped inner surface, said stair-step shaped inner surface comprising a plurality of steps having an aspect ratio in a range of between five and seven;

said multistep expansion nozzle being sized to produce a turbulence level about 6 times higher than a gradually expanding nozzle without a stepped inner wall.

* * * * *